United States Patent [19]

Zielke et al.

[11] 4,257,873

[45] Mar. 24, 1981

[54] HYDROCRACKING WITH MOLTEN ZINC CHLORIDE CATALYST CONTAINING 2–12% FERROUS CHLORIDE

[75] Inventors: Clyde W. Zielke, McMurray; Gary H. Bagshaw, Library, both of Pa.

[73] Assignees: Conoco, Inc., Stamford, Conn.; The United States of America as represented by the United States Department of Energy, Washington, D.C.

[21] Appl. No.: 102,165

[22] Filed: Dec. 10, 1979

[51] Int. Cl.³ .................... C10G 1/06; C10G 47/08; B01J 35/12

[52] U.S. Cl. .................... 208/108; 208/10; 252/416; 252/441

[58] Field of Search .............. 208/108, 10; 252/416, 252/441

[56] References Cited

U.S. PATENT DOCUMENTS

| | | | |
|---|---|---|---|
| 3,355,376 | 11/1967 | Gorin et al. | 208/108 |
| 3,371,049 | 2/1968 | Gorin et al. | 208/108 X |
| 3,736,250 | 5/1973 | Berg et al. | 208/10 |
| 3,764,515 | 10/1973 | Kiovsky | 208/10 |
| 4,081,400 | 3/1978 | Gorin | 208/10 |
| 4,136,056 | 1/1979 | Zielke | 208/108 X |
| 4,176,041 | 11/1979 | Mori et al. | 208/10 |

Primary Examiner—W. J. Shine
Assistant Examiner—G. E. Schmitkons
Attorney, Agent, or Firm—F. Lindsey Scott; William A. Mikesell, Jr.

[57] ABSTRACT

In a process for hydrocracking heavy aromatic polynuclear carbonaceous feedstocks to produce hydrocarbon fuels boiling below about 475° C. by contacting the feedstocks with hydrogen in the presence of a molten zinc chloride catalyst and thereafter separating at least a major portion of the hydrocarbon fuels from the spent molten zinc chloride catalyst, an improvement comprising: adjusting the $FeCl_2$ content of the molten zinc chloride to from about 2 to about 12 mol percent based on the mixture of ferrous chloride and molten zinc chloride.

3 Claims, 1 Drawing Figure

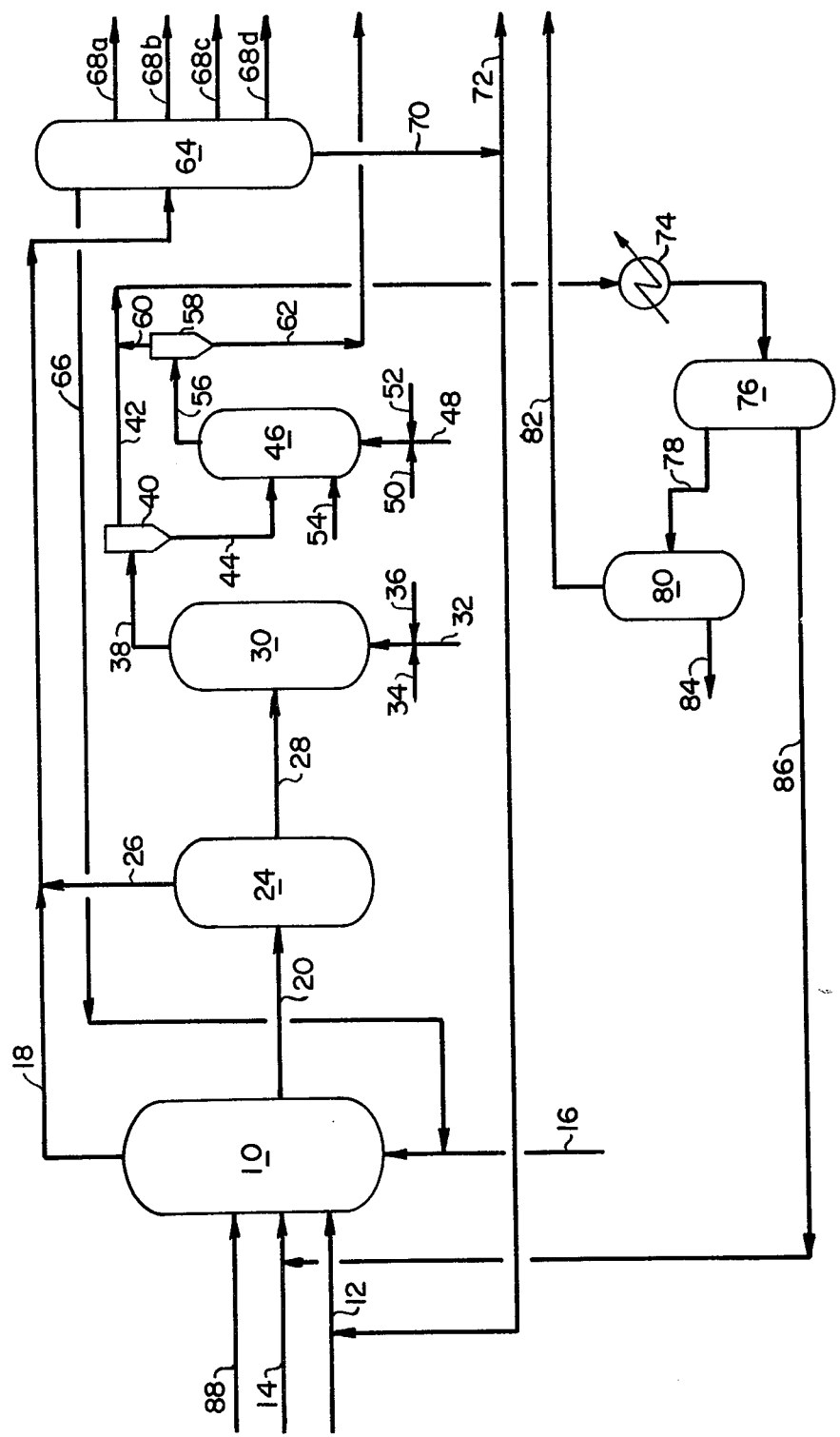

HYDROCRACKING WITH MOLTEN ZINC CHLORIDE CATALYST CONTAINING 2–12% FERROUS CHLORIDE

This invention resulted from work conducted pursuant to a contract with the United States Department of Energy (Contract No. EX-76-C-01-1743).

This invention relates to an improvement in processes for hydrocracking heavy aromatic polynuclear hydrocarbonaceous feedstocks to product lighter hydrocarbon fuels.

In recent years a shortage of petroleum feedstocks for use in producing lighter hydrocarbon fuels such as gasoline, diesel fuel and the like has been increasingly apparent. As a result of this shortage in petroleum feedstocks, increasing efforts have been directed to attempts to produce similar fuels from more abundantly available fuels such as coal of various grades and the like. One method developed to produce such lighter hydrocarbon fuels from coal and coal derived feedstocks has involved the use of molten zinc chloride as a catalyst to catalyze the reaction of such feedstocks with hydrogen to produce lighter hydrocarbon fuels. In such processes the zinc chloride is used in large amounts relative to the amount of feedstock charged to the process and is regenerated by a variety of techniques one of which involves incineration of spent zinc chloride in a suitable vessel to vaporize the zinc chloride for subsequent recovery and recycle to the reaction zone. Some such processes are shown in the following U.S. Patents.

| Patent No. | Issue Date | Inventor |
| --- | --- | --- |
| 3,355,376 | 11/28/67 | Gorin et al. |
| 3,371,049 | 2/27/68 | Gorin et al. |
| 3,594,329 | 7/20/71 | Gorin et al. |
| 3,625,861 | 12/7/71 | Gorin et al. |
| 3,629,159 | 12/21/71 | Gorin et al. |
| 3,708,270 | 1/2/73 | Birk et al. |
| 3,728,252 | 4/17/73 | Pitchford |
| 3,736,250 | 5/29/73 | Berg et al. |
| 3,764,515 | 10/9/73 | Kiovsky |
| 3,790,468 | 2/5/74 | Loth |
| 3,790,469 | 2/5/74 | Loth et al. |
| 3,844,928 | 10/29/74 | Geymer |
| 3,998,607 | 12/21/76 | Wesselhoft et al. |
| 4,081,400 | 3/28/78 | Gorin |
| 4,120,668 | 10/17/78 | Fraley |
| 4,132,628 | 1/2/79 | Pell |
| 4,134,826 | 1/16/79 | Gorin |
| 4,136,056 | 1/23/79 | Zielke |

These references are hereby incorporated in their entirety by reference.

In such processes, a large fraction of the hydrocarbon fuels produced are gasoline range materials, i.e. having a boiling point from about 28° to about 200° C. which typically corresponds to a fraction containing primarily $C_5$ and heavier hydrocarbon fuels up to a boiling point of about 200° C. This fraction comprises primarily gasoline range materials and is generally referred to as a $C_5$ by 200° C. fraction. Clearly, such materials are valuable products. As a result a continuing effort has been directed to improvements in such processes whereby the yield of $C_5$ by 200° C. materials can be improved.

It has now been found that in the practice of such processes, the fraction of the feedstock recovered as a $C_5$ by 200° C. distillate is increased by adjusting the $FeCl_2$ content of the molten zinc chloride to from about 6 to about 10 mol percent based on the mixture of $FeCl_2$ and the molten zinc chloride.

The FIGURE is a schematic diagram of a process in which the improvement of the present invention is effective.

In the FIGURE, a reactor 10 for reacting heavy aromatic polynuclear carbonaceous feedstocks such as coal with hydrogen in the presence of molten zinc chloride is shown. Coal is charged to reactor 10 via a line 12 with zinc chloride being fed to reactor 10 through a line 14 and hydrogen being charged to reactor 10 through a line 16. The resulting gaseous product stream comprising hydrocarbon fuels in a vapor phase is recovered through a line 18 and passed to further processing. Spent molten zinc chloride containing quantities of hydrocarbon fuels is withdrawn from reactor 10 through a line 20. Various recovery systems can be used although in the FIGURE a single vessel 24 is shown for the recovery of additional quantities of such hydrocarbon fuels as gases through a line 26 which joins line 18. The resulting spent zinc chloride which desirably contains from about 4 to about 6 weight percent carbonaceous material is passed to a primary regenerator vessel 30 which typically contains a fluidized bed of inert material which is maintained in a fluidized state by the injection of a free-oxygen containing gas through a line 32 to combust the carbonaceous material contained in the spent molten zinc chloride thereby vaporizing the zinc chloride which is recovered through a line 38 and passed to a gas-solids separater shown as a cyclone 40 where entrained solids and the like are separated from the vaporous zinc chloride and combustion products with the solids being passed through a line 44 to a secondary regenerator 46 and the gaseous stream comprising zinc chloride and combustion products being passed through a line 42 to further processing. Normally HCl is charged to primary regenerator 30 as shown via a line 34 and clay is optionally added to primary regenerator 30 via a line 36. The use of HCl in primary regenerator 30 is known to the art as disclosed for instance in the patents incorporated herein by reference. In secondary regenerator 46, a similar fluidized bed is maintained by the injection of a free-oxygen containing stream through a line 48 with hydrogen chloride and clay optionally being added through lines 50 and 52 respectfully. Typically a carbonaceous fuel will be added to secondary regenerator 46 as shown via a line 54. The resulting gaseous stream comprising entrained particulate solids, vaporous zinc chloride and combustion products is recovered through a line 56 and passed to a solids-gas separator 58 where a solid stream is separated and recovered via a line 62 and passed to waste with the vaporous zinc chloride and combustion products being recovered via a line 60 and passed to combination with the gaseous stream flowing through line 42. The combined streams are passed through a condenser 74 to a separator 76 from which a purified molten zinc chloride stream is recovered via a line 86 and recycled to reactor 10. A flue gas stream is recovered via a line 78 and passed to an HCl scrubber 80 where HCl is removed and recovered via a line 84 with the combustion product gases being recovered via a line 82 and passed to waste.

The product stream recovered from reactor 10 and vessel 24 via line 18 is passed to further processing in a distillation vessel 64 from which a light overhead stream containing large quantities of hydrogen is recovered via a line 66 and recycled to vessel 10 with a plurality of product streams being recovered through lines 68a, 68b, 68c and 68d. A bottoms stream is recovered through a line 70 and may be recycled to reactor 10 or passed to use as a fuel or the like via a line 72.

In the practice of the present invention, $FeCl_2$ is mixed with the molten zinc chloride in reactor 10 to result in the production of a larger portion of the hydrocarbon fuels in the range $C_5$ to 200° C. As indicated previously, it is highly desirable that the products be of this boiling range since these materials are suitable as gasoline range fuels and the like. Such products have a ready market and a relatively high value. It is undesirable that large quantities of the reaction product be found in streams lighter than about $C_5$ or heavier than about 200° C. It has been found that the use of from about 2 to about 12 mol percent $FeCl_2$ in the molten zinc chloride catalyst used in reactor 10 results in the production of a distillate which contains an increased percentage of the hydrocarbon fuels in the boiling range from $C_5$ to about 200° C. The mol percent $FeCl_2$ is based upon the mixture of $FeCl_2$ and zinc chloride and while from about 2 to about 12 mol percent has been found to be effective it is preferred that mol percents from about 5 to about 10 be used. The use of $FeCl_2$ in amounts larger than about 10 mol percent results in the conversion of a smaller percentage of the feedstocks charged and no increase in the proportion of the hydrocarbon fuels found in the desired range. Similarly, the use of insufficient amounts of $FeCl_2$ will be less effective.

While some coals contain minor amounts of iron in the ash constituents of the coal, it is believed that it will be necessary in most instances even when the zinc chloride has been recycled through many cycles in the process to add $FeCl_2$ to the zinc chloride charged to reactor 10 as a catalyst. It has been found that other constituents such as sodium chloride, calcium chloride, potassium chloride and the like result in inhibiting the conversion of the feedstocks under the reaction conditions normally used in reactor 10. Accordingly, it is necessary to use techniques known to the art to suppress the vaporization of chlorides other than zinc chloride in both primary regenerator 30 and secondary regenerator 46. While ferrous chloride could be recovered to some extent with the zinc chloride, it is believed that it will be found impractical to recover the ferrous chloride with the zinc chloride in most instances since other chloride compounds would be similarly recovered. It is therefore believed that it will be desirable in most instances to suppress the vaporization of substantially all chloride compounds other than zinc chloride in primary regenerator 30 and secondary regenerator 46 to result in the production of a substantially pure molten zinc chloride for recycle. Accordingly, it will be necessary to adjust the $FeCl_2$ content of the zinc chloride used in reactor 10. The $FeCl_2$ can be added to reactor 10 as a separate stream as shown via a line 88 or to the zinc chloride stream charged to reactor 10 or the like. The requirement is that the $FeCl_2$ content in the molten zinc chloride used in reactor 10 be in the range shown, i.e. from about 2 to about 12 mol percent.

The practice of the process shown in the FIGURE has not been discussed in great detail since such processes are considered to be known to the art, as disclosed in the patents incorporated herein before by reference. The present invention, as indicated previously, relates to an improvement in the selectivity of the process for the production of a product mixture having a large portion of the products in a given boiling range, i.e. from about $C_5$ to about 200° C.

Having thus described the invention by references to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the description of preferred embodiments and the following example.

EXAMPLE

Test runs were conducted using a solvent refined crude produced from a Kentucky bituminous coal. The solvent refined crude was produced at operating conditions of 399° C., and a hydrogen partial pressure of 13.9 atmospheres with a 60 minute residence time. A zinc chloride to feed ratio of 1.0 was used. The additives tested were sodium chloride, potassium chloride, calcium chloride and ferrous chloride at levels as high as 16.7 weight percent. The additives were added to the predried molten zinc chloride with the resulting melt being cooled rapidly to room temperature, ground and then thoroughly dried before use in the test run. The sodium and potassium chlorides used were dried before mixing with the molten zinc chloride. The calcium chloride and ferrous chloride were dehydrated prior to use, i.e. the reagent materials used were $CaCl_2.2H_2O$ and $FeCl_2.4H_2O$ which were dehydrated prior to use. The test conditions are given below in Table I where the feed conversions and product yields are also shown. It will be observed that when no additive is used, a relatively high percentage of the moisture and ash-free feedstock is converted, but the percentage of the feedstock product consisting of $C_5$ by 200° C. distillates is 36.8. When sodium chloride, calcium chloride and potassium chloride are added as additives, the portion of the products found in the $C_5 \times 200°$ C. range is reduced. Further, the percentage conversion based on the moisture and ash-free feedstock is also reduced. By contrast, when $FeCl_2$ is used, as an additive, a high percentage conversion based upon the moisture and ash-free feedstock is obtained and a higher proportion of the products produced are in the range from $C_5$ to 200° C.

TABLE I

| Feedstock | | | | ←Kentucky Coal SRC→ | | | | |
|---|---|---|---|---|---|---|---|---|
| Temperature, °C. (°F.) | ← | ← | ← | ←399 (750)→ | → | → | → | |
| $H_2$ Partial Pressure, (psig) | ← | ← | ← | ←(2000)→ | → | → | → | |
| Additive | | ←NaCl→ | → | | $CaCl_2$ | KCl | ←$FeCl_2$→ | |
| Additive, Wt. % of Catalyst | — | 0.99 | 2.94 | 5.72 | 16.75 | 5.72 | 5.72 | 5.72 | 16.75 |
| Additive, Mol % of Catalyst | — | 2.26 | 6.61 | 12.40 | 31.93 | 6.42 | 8.98 | 6.04 | 17.68 |
| $ZnCl_2$/MF Organic Feed, Wt. Ratio | ← | ← | ← | ← | 1.0 | → | → | → | → |
| Additive/$ZnCl_2$, Wt. Ratio | — | 0.01 | 0.03 | 0.06 | 0.20 | 0.06 | 0.06 | 0.06 | 0.20 |
| Final Total Pressure, psig | 2710 | 2450 | 2650 | 2330 | 2210 | 2800 | 2500 | 2800 | 2900 |
| Yields, Wt. % MAF Feed | | | | | | | | | |
| CO | 0.14 | 0.09 | 0.08 | 0.08 | 0.05 | 0.07 | 0.03 | 0.10 | 0.09 |

TABLE I-continued

| | | | | | | | | | |
|---|---|---|---|---|---|---|---|---|---|
| $CO_2$ | 0.11 | 0.01 | 0.02 | 0.02 | 0.01 | 0.01 | 0.01 | 0.01 | 0.02 |
| $H_2O$ | 1.53 | 1.52 | 2.26 | 1.50 | 1.42 | 1.62 | 0.96 | 1.90 | 1.95 |
| $CH_4$ | 0.55 | 0.59 | 0.52 | 0.52 | 0.47 | 0.55 | 0.49 | 0.64 | 0.64 |
| $C_2H_6$ | 0.69 | 0.74 | 0.68 | 0.61 | 0.45 | 0.71 | 0.59 | 0.82 | 0.86 |
| $C_3H_8$ | 1.39 | 1.33 | 1.38 | 1.10 | 0.66 | 1.22 | 1.13 | 1.83 | 1.67 |
| $i\text{-}C_4H_{10}$ | 1.66 | 0.88 | 1.73 | 1.38 | 0.32 | 1.06 | 1.18 | 2.12 | 1.50 |
| $n\text{-}C_4H_{10}$ | 0.56 | 0.18 | 0.49 | 0.47 | 0.15 | 0.32 | 0.28 | 0.50 | 0.32 |
| $C_5 \times 150°$ C. Distillate | 30.52 | 23.10 | 24.02 | 19.86 | 13.13 | 20.79 | 18.16 | 31.26 | 25.48 |
| $150 \times 200°$ C. Distillate | 6.25 | 11.94 | 8.01 | 10.38 | 6.42 | 7.35 | 8.37 | 9.57 | 11.12 |
| $200 \times 475°$ C. Distillate | 23.27 | 21.77 | 23.08 | 24.26 | 22.03 | 24.90 | 27.53 | 19.15 | 17.66 |
| Conversion, Wt. % MAF Feed | 64.14 | 60.14 | 59.18 | 57.32 | 43.94 | 56.38 | 55.89 | 65.41 | 58.17 |
| $H_2$ Consumed, Wt. % MAF Feed | 5.92 | 5.38 | 5.54 | 5.56 | 4.18 | 5.52 | 6.38 | 5.97 | 6.15 |

In addition to producing a product stream which has a higher proportion of the products in the desired boiling range the use of iron is further beneficial in that it promotes ammonia decomposition during the catalyst regeneration step in primary regenerator 30. Since the ammonia is known to inhibit the activity of the zinc chloride catalyst, the enhanced ammonia decomposition resulting from the use of iron as described herein is also desirable. Such is particularly desirable when feedstock such as the solvent refined coal in the example is used as a feedstock. Since the solvent refined coal contains substantially no ash, there is substantially no iron present in normal operations in reactor 10 to decompose the ammonia generated during hydrocracking, therefore the ammonia is free to inhibit the activity of the zinc chloride catalyst. Clearly, the $FeCl_2$ can be added to the process as such, or as various iron compounds which react with chlorine to produce $FeCl_2$, such as iron sulfides, iron carbonates, iron oxides, iron hydroxides and the like. The stream recovered through line 62 could be treated to recover iron if desired so that the iron used for addition to reactor 10 can be recovered from a process stream. Such is considered to be within the skill of those in the art and will not be discussed further.

Having thus described the invention, I claim:

1. In a process for hydrocracking heavy aromatic polynuclear carbonaceous feedstocks to produce hydrocarbon fuels boiling below about 475° C. by contacting said feedstocks with hydrogen in the presence of a molten zinc chloride catalyst, thereafter separating at least a major portion of said hydrocarbon fuels from the spent molten zinc chloride catalyst, the improvement comprising; adjusting the $FeCl_2$ content of said molten zinc chloride to from about 2 to about 12 mol percent based on the mixture of said $FeCl_2$ and said molten zinc chloride.

2. The improvement of claim 1 wherein said $FeCl_2$ content is from about 5 to about 10 mol percent.

3. The improvement of claim 1 wherein said $FeCl_2$ content of said molten zinc chloride is adjusted by adding an iron salt selected from the group consisting of iron oxides, iron sulfides, iron carbonates and iron hydroxides to said molten zinc chloride.

* * * * *